US006759464B2

(12) United States Patent
Ajbani et al.

(10) Patent No.: US 6,759,464 B2
(45) Date of Patent: Jul. 6, 2004

(54) PROCESS FOR PREPARING NANOCOMPOSITE, COMPOSITION AND ARTICLE THEREOF

(75) Inventors: Manoj Ajbani, Copley, OH (US); Joseph Frank Geiser, Uniontown, OH (US); Dane Kenton Parker, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 221 days.

(21) Appl. No.: 10/037,009

(22) Filed: Dec. 21, 2001

(65) Prior Publication Data

US 2003/0144401 A1 Jul. 31, 2003

(51) Int. Cl.$^7$ .................................................. C08K 3/34
(52) U.S. Cl. ........................ 524/445; 524/186; 524/447
(58) Field of Search ................................ 524/445, 186; 525/332.5, 332.7, 332.9, 332.8, 333.3

(56) References Cited

U.S. PATENT DOCUMENTS

| | | | |
|---|---|---|---|
| 2,531,427 A | 11/1950 | Hauser | 260/448 |
| 2,531,440 A | 11/1950 | Jordan | 252/28 |
| 3,971,746 A | 7/1976 | Hirai et al. | 260/29.7 |
| 4,569,923 A | 2/1986 | Knudson, Jr. et al. | 501/148 |
| 4,739,007 A | 4/1988 | Okada et al. | 524/789 |
| 4,810,734 A | 3/1989 | Kawasumi | 523/216 |
| 4,882,090 A | 11/1989 | Batzill et al. | 252/511 |
| 5,034,470 A | 7/1991 | Geiser et al. | 525/360 |
| 5,110,501 A | 5/1992 | Knudson, Jr. et al. | 252/315.2 |
| 5,334,241 A | 8/1994 | Jordan | 106/487 |
| 5,385,776 A | 1/1995 | Maxfield et al. | 524/413 |
| 5,552,469 A | 9/1996 | Beall et al. | 524/445 |
| 5,576,372 A | * 11/1996 | Kresge et al. | 524/442 |
| 5,578,672 A | 11/1996 | Beall et al. | 524/446 |
| 5,721,306 A | 2/1998 | Tsipursky et al. | 524/449 |
| 5,840,796 A | 11/1998 | Badesha et al. | 524/449 |
| 5,883,173 A | * 3/1999 | Elspass et al. | 524/446 |
| 6,124,365 A | 9/2000 | Lan et al. | 516/101 |

FOREIGN PATENT DOCUMENTS

WO WO 02/100923 * 12/2002

OTHER PUBLICATIONS

"Preparation and Characterization of Rubber–Clay Nanocomposites", Wang, et al, *Journal of Applied Polymer Science*, vol. 78, 2000. pp. 1879–1883.

"Introduction: From Clay Mineral–polymer Interactions to Clay Mineral–polymer Nanocomposites" Lagaly *Applied Clay Sciences*, 15 (1999). pp. 1–9.

"Geneal Approach to Nanocomposite Preparation", authorized by Ishida, et al. and published by *Chem. Material*, 2000. pp. 1260–1267.

"Reinforcement of SBS by Organophilic Clay Fillers" authorized by Galanti, et al. and published in *Rohstoffe Und Anwendungen*, 1/99. pp. 21–25.

"Synthesis and Characterization of PMMA Nanocomposites by Suspension and Emulsion Polymerization" authorized by Huang, et al., and published on the Web on Apr. 13, 2001. pp. 3255–3260.

* cited by examiner

*Primary Examiner*—Katarzyna Wyrozebski
(74) *Attorney, Agent, or Firm*—Henry C. Young, Jr.

(57) ABSTRACT

This invention relates to nanocomposites comprised of a functionalized elastomeric polymer, including oligomers which are elastomeric, which contains a particulate dispersion therein of an intercalated, and at least partially exfoliated, swellable clay, such as for example montmorillonite clay. Said clay may be pre-intercalated and thereafter blended with, or intercalated and at least partially exfoliated in situ within, a functionalized elastomer in an aqueous medium, wherein said functionalized elastomer contains at least one functional group selected from acid, acid-salt, anhydride, and protonated amine-modified epoxy groups. The invention further relates to articles of manufacture, including industrial belts and tires, having at least one component comprised of such nanocomposite where such component may be a coating thereon or other integral component. Such tire component may be, for example, a tire tread, tire sidewall and/or tire innerliner.

24 Claims, No Drawings

PROCESS FOR PREPARING NANOCOMPOSITE, COMPOSITION AND ARTICLE THEREOF

FIELD OF THE INVENTION

This invention relates to nanocomposites comprised of a functionalized elastomeric polymer, including oligomers which are elastomeric, which contains a particulate dispersion therein of an intercalated, and at least partially exfoliated, swellable clay, such as for example montmorillonite clay. Said clay may be pre-intercalated and thereafter blended with, or intercalated and at least partially exfoliated in situ within, a functionalized elastomer in an aqueous medium, wherein said functionalized elastomer contains at least one functional group selected from acid, acid-salt, anhydride, and protonated amine-modified epoxy groups. The invention further relates to articles of manufacture, including industrial belts, and tires, having at least one component comprised of such nanocomposite where such component may be a coating thereon or other integral component. Such tire component may be, for example, a tire tread, tire sidewall and/or tire innerliner.

The practice of this invention is considered herein to be a significant departure from a past practice of preparing a nanocomposite of elastomer and intercalated clay where such preparation has relied upon polymerization of elastomer precursor(s) in the presence of a water-swellable clay.

BACKGROUND OF THE INVENTION

Nanocomposites of elastomer(s) and intercalated water swellable clay, including partially exfoliated clays, have been prepared, for example, by polymerizing elastomer precursor(s) in an aqueous medium in the presence of the water swellable clay and have been prepared by pre-intercalating a water swellable clay with a quaternary ammonium salt and blending the clay with an emulsion of elastomer particles.

This invention contemplates two aspects of preparing nanocomposites comprised of elastomer modified clays and a third aspect of utilizing such prepared nanocomposites for the preparation of articles of manufacture.

The first aspect of preparing nanocomposites as elastomer modified clays contemplates elastomer intercalating an organoclay of a 2:1 layered silicate which contains a quaternary ammonium salt surfactant by blending the organoclay with an aqueous dispersion of pre-formed functionalized diene-based elastomer particles. The functional groups of the functionalized diene-based elastomer particles are selected from acid, acid-salt and/or anhydride groups. Preferably, the quaternary ammonium surfactant on the organoclay contains hydroxyl groups.

The second aspect of preparing nanocomposites as elastomer modified clays contemplates intercalating a clay of a 2:1 layered silicate which contain exchangeable cations within its galleries, by blending the clay with an aqueous dispersion of functionalized diene-based elastomer particles. For this aspect of the invention, the clay is not pre-intercalated with a quaternary ammonium salt. The functional groups of said functionalized elastomer particles are protonated amine modified epoxy groups. The exchangeable cations within the galleries of the clay may be comprised of, for example, one or more of sodium, potassium, magnesium and/or calcium ions. The protonation of said amine modified epoxy groups is envisioned to result in elastomer bound protonated amines which carry a cationic charge (e.g. N⁺) which provides for an ion exchange between said functional elastomer particles and said cation within said galleries.

The third aspect of the invention contemplates a utilization of blends of elastomer-modified clays of the first and/or second aspects of the invention with additional rubber composition ingredients comprised of, for example, reinforcing fillers, processing aids and curatives as well as additional elastomers.

An advantageous practice of the first aspect of the invention is a contemplated enablement of the use of a pre-formed functionalized elastomer of a molecular weight which can be tailored to a desired range of values to thereby provide an enhanced comparability of the functionalized elastomer with the organoclay in an aqueous medium without the need of organic solvents for aqueous dispersability of pre-formed elastomers. The practice of the first aspect of the invention is considered herein to be novel and a departure from past practice, particularly for the use thereof in the preparation of articles of manufacture such as, for example tires and industrial products such as belts and hoses.

For the second aspect of the invention, a functionalized elastomer in an aqueous medium is used in which the functionalized elastomer contains a protonated (cationic) charged bound to the elastomer due to protonation of amine modified epoxy functional groups on the elastomer which is, in turn, relied upon to intercalate the clay by an ion exchange process.

An advantageous practice of the second aspect of the invention is a contemplated enablement of use of a pre-formed functionalized elastomer of a molecular weight which can be tailored to a desired range of values to thereby provide an enhanced compatibility of the functionalized elastomer with the clay in an aqueous medium without the need of organic solvents for aqueous dispensability of pre-formed elastomers.

An additional advantageous practice of the second aspect of the invention is a contemplated enablement of eliminating a need of pre ion exchanging the 2:1 layered silicate (clay) with a quaternary ammonium salt (prior to addition of the clay to the functionalized elastomer) to thereby enhance compatibility of the diene-based elastomer with the hydrophilic 2:1 layered clay by virtue of the ion exchange mechanism directly with the protonated amine modified epoxy groups of the functionalized elastomer without the need of organic solvents. Such practice is considered herein to be novel and a departure from past practice, particularly for the use thereof in the preparation of articles of manufacture such as, for example tires and industrial products such as belts and hoses.

Historically, nanocomposites are composed of an elastomer and dispersion therein of an intercalated and partially exfoliated water-swellable clay.

From an historical prospective, water swellable layered silicate clays themselves which have been pre-intercalated with a non-polymeric intercalate such as for example a quaternary ammonium salt, might be referred to as an "organoclay". The water-swellable clay is comprised of a plurality of stacked platelets which contains cationically exchangeable ions in the galleries between the platelets. The clay is intercalated by an ion exchange phenomenon between such ions within the galleries and, for example a more bulky quaternary ammonium salt to cause the galleries to expand. Such quaternary ammonium salt may contain olephilic or organophilic groups.

It is considered herein, however, that the efficiency of such intercalation or exfoliation of the clay is often insufficient to significantly improve many of the physical properties of the associated elastomer.

Swellable clays for use in this invention may sometimes be referred to as 2:1 layered silicate or clay. The clay materials that are crystalline have layer structures or layer ribbon structures which is considered herein to be well known to those having skill in such art. In such clay terminology, the basic configuration of the layer-structure may be described in terms of planes, sheets, layers, interlayers and the unit structure which is also considered herein to be well known to those having skill in such art. A single plane of atoms or ions may by form the minimum unit. A sheet may be an articulated combination of planes, and a layer may be an articulated combination of sheets. Layers may be separated from one another by an interlayer or a gallery. The layer structure can be divided into two groups, namely a 2:1 layer type and a 1:1 layer type, based upon the population of the sheets within the layer.

The general clay terminology is described in "Developments in Sedimentology 31", *Electron Micrographs of Clay Materials*, Elsevier Scientific Publishing Company, 1981. The clays referred to in this invention are clays that are readily swellable in a sense that that the spacing between the clay galleries is expandable, or swellable, from their original values. Accordingly, 2:1 layered silicates which are not readily swellable, such as talc (which does not contain exchangeable cations within its galleries), that do not have appreciable and significant swelling potential, are intended to be excluded from the practice of this invention. When the 2:1 layered silicate, or clay, is water swellable, it may be generally be referred to herein as 2:1 layered water swellable clay.

The ion exchanged clay for the second aspect of this invention may be prepared, for example, by obtaining a water-swellable 2:1 multi-layered clay, such as, for example, montmorillonite, which contains cationically exchangeable sodium ions in the galleries between its layers, and causing an ion exchange to occur in which such sodium ions are exchanged with more bulky cationic functionalized elastomer particles in an aqueous dispersion thereof created by dispersing the pre-formed functionalized elastomer in water, to cause the distance between the layers of the clay to substantially increase by displacing the sodium ions with the protonated amine containing elastomer.

An organoclay for use in first aspect of the invention may alternatively be prepared by dispersing multi-layered smectite clay (e.g. a sodium montmorillonite clay) in water which either contains, or to which is added, a quaternary ammonium salt, in which the cationically ion exchangeable ions (e.g. sodium ions for the montmorillonite clay) in the galleries between the layers of the clay are replaced by an ion exchange mechanism with more bulky ions of the quaternary ammonium salt. The resulting ion exchanged organoclay may then dried and subsequently mixed with the water dispersion of the pre-formed functionalized elastomer which contains at least one functional group selected from the group consisting of acid, acid salt, and/or anhydride functional groups.

In practice, water swellable natural smectite clays, and particularly montmorillonite clays, can be changed from being hydrophilic in nature to an intercalated clay being more hydrophobic or organophilic in nature by the practice of this invention as well as swellable layered synthetic clays which contain cationically exchangeable ions in its galleries which are hydrophilic in nature.

From an historical perspective, some naturally occurring layered clay minerals such as, for example, sodium-montmorillonite clay, which are hydrophilic in nature, are composed of a plurality of stacked platelets which have a tendency to swell in the presence of water as evidenced by an associated increase of the distance between the platelets.

Such clay, particularly montmorillonite clay, contains cationically exchangeable ions in the galleries between the clay platelets which can be ion changed. For such ion exchange of a montmorillonite clay, the clay may be immersed in water to cause the clay to swell and a quaternary ammonium salt introduced, or included, in the water to cause the typically occurring sodium ions in the space between the platelets to be exchanged with the quaternary ammonium ion from the quaternary ammonium salt to further expand the distance between the platelets and to thereby ion exchange the clay. If an alkyl quaternary ammonium salt is used which can impart aliphatic hydrocarbon chains on the surface of the clay and also between the clay galleries by the ion exchange process, the resultant ion exchanged organoclay can become more hydrophobic in nature and therefore more compatible with elastomers, particularly with diene-based elastomers primarily in bulk thermomechanical mixing methods that do not contain water or in processes that incorporate large amounts of organic solvent.

The organoclay may then be dried and blended with an elastomer(s) under conditions of elevated temperature and relatively high shear conditions to cause the ion exchanged clay to at least partially intercalate and/or exfoliate, or separate into small, individual platelets within the rubber composition and to contribute to the reinforcement of the rubber composition itself. Such pre-intercalation procedure for montmorillonite clay and use thereof for reinforcement of rubber compositions by blending with various known to those having skill in such art. Often the extent of intercalation and exfoliation is limited, thereby the potential of exposing the high surface area of the 2:1 layered silicates to the elastomer is not fully utilized and optimum overall physical properties are not considered herein to be achieved.

Alternately, the multi-layered, stacked clay particles, (e.g., an montmorillonite clay) may be polymer intercalated. See, for example, U.S. Pat. No. 5,883,173 in which a latex is provided comprised of water, an ion exchangeable surfactant, and layered material such as a layered clay having an interlayer separation and a cationic exchange capacity, wherein layered clay is intercalated by in situ polymerization of monomers selected from, for example, styrene and butadiene to thereby expand the interlayer separation of layered clay. Alternatively said patent relates that a polymer (e.g. styrene/butadiene polymer) may be pre-formed and later converted to latex to which the layered clay is to be added. For the preformed polymers, excess solvent amounts of solvents such as dimethyl formamide and alcohols were usually needed for incorporation of the polymer in a latex form. A solvent dry-off procedure may also be required. This requires extra energy and increased time and may pose additional environmental issues. In U.S. Pat. No. 5,883,173 the first step for making a nanocomposites is to prepare the silicate clay slurry and then add a quaternary ammonium surfactant for conducting an ion exchange between the un-ion exchanged silicate clay and the quaternary ammonium surfactant. The nanocomposite preparation follows thereafter by the addition of this wet slurry to the polymerizable monomers or solvent aided latex formed from the pre-formed polymers. U.S. Pat. No. 5,883,173 does not teach the use of making nanocomposites by mixing an ion exchanged 2:1 layered silicate, or an organoclay, that is available in a relatively dry powder form and is already exchanged with alkyl quaternary ammonium salts. The incorporation of these ion exchanged dry 2:1 layered silicates in an aqueous medium without the aid of a solvent is considered herein to be very difficult and nanocomposite preparation with such dry organoclays in an aqueous medium is not considered herein to be easily achievable.

It is appreciated that preparation of thermoplastic polymer/clay nanocomposites has heretofore been reported in "Synthesis and Characterization of PMMA Nanocomposites by Suspension and Emulsion Polymerization" by Haung and Brittain, Macromolecules 2001, 34, 3255 through 3260, published on the Web on Apr. 13, 2001. There, it has been suggested to introduce a smectite clay, which is said to be composed of silicate layers, into a pre-formed thermoplastic polymer latex such as, for example a poly(methyl methacrylate), or PMMA, latex, which contains a cationic surfactant, which may be a polymerizable surfactant, and which relies upon an interaction of the cations of the surfactant with anionic charges on the clay platelets and to which polymers of the polymerizable surfactant may become tethered to the surface of the platelets. It is understood herein, from the publication, that exfoliation of the platelets is obtained upon melt processing of the thermoplastic based nanocomposite. A significant purpose in the preparation of such a thermoplastic nanocomposite polymer of methyl methacrylate is understood to be enhanced heat durability of the poly(methylmethacrylate) thermoplastic polymer without a sacrifice in its clarity. The said publication does not suggest that a protonated amine modified epoxy functionalized elastomer may be used for ion exchange and intercalation of the multi-layered smectite clay in an aqueous medium.

However, for the aspects of this invention, a nanocomposite of functionalized elastomer and intercalated swellable clay (e.g. intercalated 2:1 layered silicate clay) is prepared by blending, in an aqueous medium, a dispersion of the clay and functionalized elastomer particles, namely an elastomer functionalized with at least one functional group selected from the group consisting of acid, acid-salt, anhydride and protonated amine modified epoxy functional groups.

It is considered herein to a novel preparation of a nanocomposite by introducing an intercalated organoclay, as an ion exchanged, water swellable, 2:1 layered silicate clay, to a functionalized elastomer, wherein said functionalized elastomer is pre-formed and subsequently dispersed in an aqueous medium to form an aqueous dispersion of the functionalized elastomer particles, to further intercalate and partially exfoliate the clay platelets.

It is considered herein that such method is novel and significantly different from (A) simply mixing an ion exchanged clay with an elastomer, (B) co-polymerizing the monomers to form a diene-based elastomer in the presence of a swellable clay, or (C) using a pre-formed polymer and making a latex dispersion of the polymer in water but with the aid of solvents.

Alternately, in the practice of the first aspect of this invention, the swellable 2:1 layered clay is intercalated in situ in the water dispersion of functionalized elastomer particles via an aqueous intercalation mechanism that is envisioned as providing sufficient driving force for the functionalized elastomer particles to enter the galleries between the platelet layers of the water swellable clay in the aqueous medium without the need of polymerization of the elastomer precuser monomers. By doing so, it is considered herein that there are no highly significant constraints on the molecular weight of the elastomer for preparing the nanocomposite and inherent incompatibility between a clay having a hydrophilic property and diene based elastomer is avoided.

In the practice of the second aspect of the invention, the water swellable 2:1 layered clay is mixed with an aqueous dispersion of a diene-based elastomer that contains a cation as a protonated amine modified epoxy group for carrying the ion exchange with the cations contained in the galleries between the clay layers. By doing so, it is considered herein that there are no highly significant constraints on the molecular weight of the functionalized diene based elastomer and, further, inherent incompatibility between a swellable layered clay having a hydrophilic property and functionalized diene-based elastomer is avoided without a need for an ion exchange between cationically exchangeable ions in the clay galleries with a quaternary ammonium surfactant.

In practice, for the first aspect of the invention, it is considered herein that a balance of pH conditions for the ion exchange mechanism, or intercalation, is desirable, and perhaps necessary, to significantly enhance the water dispersibility of the functionalized elastomer and also to allow the organoclay to remain in the aqueous dispersion of functionalized elastomer particles and organoclay to thereby permit the entrance of the functionalized elastomer particles within the organoclay galleries for intercalation of the organoclay. Accordingly, it is considered herein that such pH of the aqueous medium may be desirably closer to a neutral pH, and preferably a somewhat basic pH in order to reduce the presence of acid salts. Accordingly, the pH may desirably be a value in a range of about 7 to about 14, and perhaps more preferably in a range of about 7.1 to about 8.

In contrast, for the second aspect of the invention, it is considered herein that a pH of the aqueous medium may desirably be acidic in nature to enhance the protonation step and water dispersibility or the functionalized elastomer. Therefore a pH in a range of from about 2.5 to about 6.9, alternately from about 3.5 to about 5 might be desirable.

In the practice of this invention, as hereinbefore related, by dispersing the pre-formed functionalized elastomer particles in an aqueous medium, a desired and tailored molecular weight of the functionalized elastomer can be used without an excessive need for organic solvents for the clay intercalation procedure. Such practice is considered herein to be novel and a departure from past practice.

In particular, for the first aspect of the invention, the use herein of a pre-formed organoclay, namely use of a swellable 2:1 layered clay which contains a quaternary ammonium salt that preferably contains hydroxyl groups to form an organoclay, for making the nanocomposite of the acid, acid salt and/or anhydride functionalized diene-based elastomer as a dispersion thereof in an aqueous medium is considered herein to be a departure from past practice.

Such hydroxyl group-containing quaternary ammonium salt may be, for example, methyl-tallow bis-2-hydroxyethyl ammonium halide. The said quaternary ammonium salt with hydroxyl groups is seen herein to promote a suitable balance of physical properties for the resultant nanocomposite and associated vulcanized article of manufacture which has at least one component as a rubber composition comprised of said nanocomposite.

Historically, blending of an organoclay with a thermoplastic or thermosetting polymer by a melt blending process is discussed in U.S. Pat. Nos. 4,739,007; 4,810,734; 5,385,776; 5,578,672 and 5,840,796. Historically, blending of an adduct of a mineral filler such as for example a montmorillonite clay, and a quaternary ammonium salt with at least one rubber and an organosilane is discussed in U.S. Pat. No. 4,431,755.

Representative of swellable clays or silicates suitable for use in the practice of this invention are the 2:1 layered silicates such as, for example, smectite, vermiculite and mica clays. Representative of smectite clays are, for example, montmorillonite, bentonite, hectorite, saponite, nontronite, beidellite, fluorohectorite, stevensite, volkonskoite, sauconite, laponite, related analogs thereof and their physical blends or mixtures where montmorillonite is usually preferred. Preferable clays of the smectite group are montmorillonite and hectorite clays, primarily based upon availability.

Such clays, in their natural state are conventionally very hydrophilic in nature and therefore not highly compatible with diene-based elastomers.

Such clays contain cationically exchangeable ions in their galleries.

In the course of preparing an organoclay from such clays, at least a portion of such cationically exchangeable ions within the clay galleries become substituted by an by a more bulky organic and non-polymeric cation such as a surfactant as a quaternary ammonium salt with alkyl groups, or by an organophosphorous ion, including ions of the type known in the art as an oniumion. Some representative examples of surfactants for such purpose or preparing an organoclay includes, for example, methyl tallow bis-2hydroxy ethyl ammonium salt, dimethyl hydrogenated tallow (2-ethylhexyl ammonium salt, dimethyl benzyl hydrogenated-tallow ammonium salt, dimethyl dihydrogenated tallow ammonium salt, wherein the counterion in the salt may be a halide. The surfactant concentration in the clay may be below, at or above its cation exchange capacity, as is well known by those having skill in such art.

In practice, the water swellable, 2:1 layered silicate clays are changed from being hydrophobic in nature to being hydrophilic in nature by such ion exchange process and therefore more readily dispersible in diene-based elastomers.

Historical examples relating to preparation of organophilic clays, which may also include converting clays other than the 2:1 layered silicates organophilic include, for example, U.S. Pat. Nos. 2,531,427 and 2,531,440 which relate to general processes for the preparation of various organoclays. U.S. Pat. No. 5,110,501 relates to process for preparing organophilic clay in which the starting materials are reacted in slurry under high shear. U.S. Pat. No. 5,334,241 relates to a low moisture, direct addition process for the fabrication of the organophilic clays. U.S. Pat. No. 4,569,923 relates to a process for preparing organoclays in which the clay is subjected to high-energy pugmilling before reaction with the cation. U.S. Pat. Nos. 2,531,427, 2,531,440, 5,110,501 and 5,334,241 are incorporated herein in their entirety.

In the description of this invention, the term "phr" is used to designate parts by weight of a material per 100 parts by weight of elastomer. The terms "rubber" and "elastomer" may be used interchangeably unless otherwise indicated. The terms "vulcanized" "cured", and "crosslinked" may be used interchangeably, as well as "unvulcanized", "uncured" or "uncrosslinked", unless otherwise indicated.

In the description of this invention, the term dispersion means the dispersed medium is a liquid, such as for example water for an aqueous medium, and the dispersed phase is a solid such as for example elastomer particles and organoclay particles.

The term "Tg" relates to a glass transition of an elastomer measured by a Differential Scanning Calorimeter with a heating rate of 10° C. per minute and is taken as the mid-point of the slope in the obtained thermogram and is known to those skilled in the art (e.g. ASTM D3418).

The term "number average molecular weight" or MN refers to the molecular weight of the oligomer and polymer as referred in the *Textbook of Polymer Science*, $3^{rd}$ Edition, Fred W. Billmeyer, Jr., John Wiley & Sons, 1984. It may be measured by methods described in the said *Textbook of Polymer Science* which may include Gel Permeation Chromatography (GPC) or end group methods and is expressed in grams/mole or g/mol.

In the description of this invention, the term "dispersion" in this invention also includes the term "suspension", unless otherwise indicated, which is generally used for the dispersions where the particle size of the dispersed solid phase is greater than the colloidal dimensions (e.g. one micron or more).

No differentiation is made in this invention between the terms "dispersion" and "suspension", unless otherwise indicated. If the dispersed phase are functionalized elastomer particles, particularly functionalized diene-based elastomer particles, it is intended that such description includes an oligomer of low molecular weight functionalized elastomer unless otherwise indicated. An aqueous dispersion of a functionalized elastomer may be referred to as, for example, an aqueous dispersion or latex, unless otherwise indicated. For this invention, if the dispersion of the functionalized polymer particles in water appears to be visibly clear to the naked eye, the dispersion might be referred to as an aqueous solution.

In this invention, the term "epoxide" or "epoxy" or "epoxidized" elastomer may be used interchangeably and indicates that the elastomer contains epoxy functional groups which are known to those well skilled in the art of polymer chemistry.

In this invention, the term "nanocomposite" is referred to as a material that contains more than one phase with one phase being an elastomer and at least one other phase being a swellable multi-layered clay, such as montmorillonite, and the thickness of the said clay in the nanocomposite is observed or measured to have substantially reduced from its original value, more specifically the measured or observed thickness of the separated or delaminated platelets (and/or stacked platelets) of the said clay is in the order of a few nanometers, most specifically in the order of about 2 to 20 nanometers or so.

SUMMARY AND PRACTICE OF THE INVENTION

In accordance with this invention, a process of preparing a nanocomposite comprised of a functionalized diene-based elastomer and a 2:1 layered clay comprises blending:

(A) an aqueous dispersion of a functionalized diene-based elastomer having a Tg in a range of about −120° C. to about +10° C. and a number average molecular weight in a range of about 1,000 to about 1,000,000 g/mole, wherein said elastomer is selected from copolymers of at least one of isoprene and 1,3-butadiene and copolymers of styrene or alpha methyl styrene with at least one of isoprene and 1,3-butadiene, and (B) a particulate 2:1 multi-layered swellable silicate clay; wherein:
(1) said elastomer contains one or more functional groups selected from at least one of acid, acid-salt and acid-anhydride groups, wherein said aqueous dispersion has a pH in a range of from about 7.1 to about 14 and wherein said clay contains a non-polymeric salt of a quaternary ammonium ion in the galleries between its layers, or
(2) said elastomer contains one or more functional groups as protonated amine modified epoxide groups, wherein said aqueous dispersion has a pH in a range of about 2.5 to about 6.9 and wherein said clay contains at least one cationically exchangeable ion in the galleries between its layers comprised of at least one of sodium, magnesium, potassium and calcium ions.

The resulting nanocomposite may be recovered, for example, by drying or by coagulation by methods well known to those having skill in such art. Such recovery methods may include, for example, precipitation in alcohols and/or lowering the pH of the aqueous dispersion from a basic value of greater than 7 to an acidic value of less than 7 or raising the pH of the aqueous dispersion from an acidic value of less than 7 to a basic value of greater than 7.

In further accordance with this invention, a nanocomposite of said functionalized diene-based elastomer and said intercalated swellable clay is provided as prepared by the process of this invention.

In additional accordance with this invention, a rubber composite is provided as a blend of said nanocomposite and at least one additional elastomer, additional reinforcing agent and/or coupling agent.

In further accordance with this invention an article of manufacture is provided having at least one component comprised of said nanocomposite and/or said rubber composite.

In additional accordance with this invention, a tire is provided having at least one component comprised of said nanocomposite and/or said rubber composite. In one aspect of the invention, said component may be, for example, a tire tread, tire sidewall and/or tire innerliner.

For the first aspect of the invention, the acid, acid-salt and anhydride groups for the functionalized elastomer may be incorporated in the backbone or side chains of the elastomer or may be incorporated in the elastomer by either grafting or copolymerization with the monomer precursors for the elastomer which may be conducted either in an organic solvent or an aqueous based polymerization by methods known to those having skill in such art.

The functionalized elastomer for the first and second aspects of the invention may contain, for example, up to about 40 percent by weight of such functional groups based on the total functionalized elastomer. For example, such functionalized elastomer may contain from about 5 to about 40, alternatively about 5 to about 25 and further alternately about 5 to about 10, weight percent of such functional groups. For example, if the average molecular weight of the elastomer particles in the aqueous dispersion or solution is greater than about 10,000 g/mol., then the preferred functional group content may be only up to about 10 weight percent by weight.

Regarding the first aspect of the invention, U.S. Pat. No. 5,300,569 describes processes for making anhydride functionalized diene based elastomers and is incorporated herein in its entirety.

"Maleinized-Polybutadiene Latex for Fiber to Rubber Adhesion", Paper No. 51, presented at the 115$^{th}$ Rubber Division meeting, American Chemical Society, Apr. 13 through 16, 1999, describes methods of preparing aqueous dispersions or solutions of maleinized-polybutadiene or maleinized-styrenelbutadiene rubber. This paper relates to creating an aqueous dispersion of the functionalized elastomer particles by heating the functionalized elastomer in a liquid form in presence of a water-dispersing surfactant, alkaline water for base salting the elastomer and providing aqueous dispersability. Aqueous dispersions of carboxyl-terminated polybutadiene rubber particles may be prepared in such manner.

Regarding the first aspect of the invention, functionalized elastomers, in which the functional groups are acid, acid salt or anhydride groups may also be prepared by emulsion-polymerization of elastomer precursor monomers such as, for example, monomers selected from 1,3-butadiene or a combination of styrene and 1,3-butadiene together with a minor amount (e.g. up to about 10 to 12 weight of the monomers) of one or more additional monomers selected from methacrylic acid, acrylic acid, methacrylic anhydride, mesaconic anhydride, itaconic acid, maleic anhydride, cis-3 bromo acrylic acid, crotonic acid, itaconic anhydride, citraconic acid or anhydride, fumaric acid, and 2-ethyl acrylic acid. The resulting acid, acid salt or anhydride functionalized diene-based elastomer particles are contained in an aqueous latex form and may be utilized for preparing the nanocomposite by mixing the latex with the aforesaid swellable 2:1 layered silicate, preferably an organoclay.

Regarding the first aspect of the invention, the functionalized elastomer may also be prepared by incorporating carboxylic acid functionalities into the elastomer chain through grafting or copolymerization of esters of carboxylic acids, which may be later converted to the carboxylic acid functionality by saponification of the ester. Representative carboxylic acids are, for example, maleic acid, succinic acid, itaconic acid, crotonic acid, acrylic acid and methacrylic acid, particularly maleic acid.

For example, U.S. Pat. No. 3,971,746 relates to preparation of a latex of a modified polyisoprene containing carboxylic acid functional groups which is considered herein as being suitable to prepare the nanocomposite of the first aspect of this invention.

Regarding the second aspect of the invention, preparation of a functionalized polyisoprene elastomer as an epoxidized natural or synthetic cis 1,4-polyisoprene elastomer is contemplated in U.S. Pat. No. 5,034,470 that relates to preparation of a synthetic epoxidized polyisoprene Regarding the second aspect of the invention, epoxidized natural cis 1,4-polyisoprene rubber may be prepared, for example, by treatment of natural rubber latex with, for example, of aqueous hydrogen peroxide which is believed to be well known to those skilled in such art. Epoxidized natural rubber may be obtained as, for example as Epoxyprene, a tradename of Guthrie Latex Inc.

For example, epoxidized polybutadiene rubber, or elastomer, preferably of a relatively low molecular weight on a range of about 1000 to about 5000 g/mole, may also be used for preparing the nanocomposite of the second aspect of the invention.

Regarding the second aspect of the invention, when the epoxide-containing diene-based elastomer is obtained in bulk for conversion to a water dispersion thereof, it is preferred that it has a molecular weight of less than about 10,000 g/mole to aid in its dispersibility in water.

For the second aspect of the invention, functionalized elastomers which contain protonated amine modified epoxide groups may be prepared by amine modification of epoxy group-containing diene-based elastomers and then protonating the product.

For the second aspect of the invention, functionalized elastomers which contain epoxide functionality (e.g. epoxide groups) will preferably have a Tg in a range of about −120° C. to about +10° C., and alternately from about −100° C. to about −10° C., and a number average molecular weight within a range of about 1,000 to 1,000,000 g/mol. Functionalized elastomers which contain epoxide functionality with a Tg higher than +10° C. may also be employed, but the polymer may not be as elastomeric in nature. Some epoxy containing resins are described in detail, for example, in U.S. Pat. No. 4,882,090.

For the second aspect of the invention, primary and secondary amine based compounds for providing amine functionality for an epoxide-containing functionalized elastomer may preferably be water soluble or dispersible. Examples of such amines are recited in U.S. Pat. No. 4,882,090 which may include, for example, alkylamines and dialkylamines, such as, for example, methylamine, ethylamine, propylamine, butylamine, dimethylamine, diethylamine, dipropylamine, methylbutylamine and dialkylaminoalkylamines. In most cases, low molecular weight amines are preferred but it is possible to use polymeric amines that may be dispersible in water or may be available in an aqueous latex form.

For the second aspect of the invention, polyamines with primary and secondary amines can be reacted with epoxide groups to form corresponding ketimines. The reaction products may be acid-neutralized (e.g. protonated) with water-soluble acids such as, for example, boric acid, formic acid, lactic acid, propionic acid, butyric acid, hydrochloric acid, phosphoric acid, sulfuric acid, carbonic acid and acetic acid for protonating or providing the cationic charge on the functionalized elastomer. The acid-neutralization or acid salting of the reaction products of epoxides and amines (e.g. ketimines) enables the pH of the aqueous dispersion to be preferably in an acidic state, preferably in a range of about 2.5 to 6.9. The protonation may also provide water dispersibility and the pH of the dispersions is acidic (e.g. less than a value of 7.0). The water dispersibility of the amine modified epoxy-containing diene based elastomers may also be introduced by reacting the epoxide groups with salts of an amine such as a salt of a tertiary amine provided the salting does not cause the reaction product to gel.

Regarding the second aspect of the invention, in the case of elastomers containing epoxy groups that are available in the form of a latex such as styrene-butadiene-glycidyl methacrylate terpolymers due to the emulsion polymerization process or elastomers that may be made available in a latex form such as an epoxidized natural rubber, the primary or secondary amines may be mixed with the epoxy containing diene elastomer latex for carrying the reaction with the epoxide groups in a manner and under suitable mixing conditions which may include an appropriate temperature range. The protonaton of the amine modified epoxide for introducing the cationic charge on the reaction product of the amine modified epoxide functionality (e.g. ketimines) may then be provided by partial neutralization with the water soluble acids, in a manner and under suitable conditions, including mixing and heating, so that the elastomer is not coagulated before mixing with an aqueous dispersion of the water-swellable clay (e.g. sodium montmorillonite clay), or powder form of the water-swellable clay.

Regarding the second aspect of the invention, functionalized elastomer containing protonated amine modified epoxide groups may be blended and agitated with the aqueous dispersion or slurry of the un-ion exchanged, water-swellable 2:1 layered clay (e.g. sodium montmorillonite). The cationic charge on the functionalized elastomer (e.g. the amine modified epoxide group) may allow the ion exchange between the cationically exchangeable ions in the galleries of the water-swellable clay (e.g. sodium-montmorillonite) and may serve to anchor the functionalized elastomer within and on the clay surfaces without the need of the use of the pre-ion exchanged organoclays or need for preparing the ion exchanged organoclays with quaternary ammonium salts.

Regarding the second aspect of the invention, as hereinbefore related, the molecular weight of the functionalized elastomer used to intercalate and ion exchange with the water-swellable clay may be better controlled in the functionalized elastomer formative stage and prior to mixing the pre-formed functionalized elastomer with the 2:1 layered silicate and without a need of the aid of an organic solvent for elastomer dissolution.

Regarding the first aspect of this invention, the intercalation of the clay within the aqueous dispersion or solution of the functionalized elastomer might be conducted, for example, by slowly introducing the 2:1 layered silicate in the water dispersion of the acid-functionalized elastomer at a temperature in a range of about 20° C. to about 100° C. The intercalation is preferably done in the aqueous medium in a pH value of greater than 7.0. The 2:1 layered water-swellable silicate clay may or may not be pre-treated with a quaternary ammonium surfactant, but for improved physical properties of the rubber composition used as a component of an article of manufacture, it is preferred that the clay contains a quaternary ammonium surfactant, particularly where the quaternary ammonium surfactant contains hydroxyl groups. It is considered herein that it is significant that intercalation of the pre-treated and relatively dry 2:1 layered organoclays in an aqueous polymeric dispersion may be possible because such treated and relatively dry organoclays have very poor water dispersability and wetting characteristics.

For the first aspect of the invention, it is contemplated that the clays to be used contain quaternary ammonium surfactant selected from, for example, methyl tallow bis-2-hydroxyethyl ammonium bromide and/or chloride, methyl tallow bis-2-hydroxyethyl ammonium alkyl sulfates, methyl tallow bis-2-hydroxyethyl ammonium nitrate, methyl-tallow bis-2-hydroxyethyl ammonium hydroxide, methyl-tallow bis-2-hydroxyethyl ammonium acetate, methyl tallow bis-2-hydroxyethyl ammonium phosphate, dimethyl hydrogenated-tallow (2-ethylhexyl) ammonium halides, dimethyl hydrogenated-tallow (2-ethylhexyl) ammonium alkyl sulfates, dimethyl hydrogenated-tallow (2-ethylhexyl) ammonium nitrate, dimethyl hydrogenated-tallow (2-ethylhexyl ammonium hydroxide, dimethyl hydrogenated-tallow (2-ethylhexyl) ammonium acetate, dimethyl hydrogenated-tallow (2-ethylhexyl) ammonium phosphate, dimethyl dehydrogenated-tallow ammonium halides, dimethyl dehydrogentated-tallow ammonium alkyl sulfates, dimethyl dehydrogenated-tallow ammonium nitrate, dimethyl dehydrogenated-tallow ammonium hydroxide, dimethyl dehydrogenated-tallow ammonium acetate and dimethyl dehyrogenated-tallow ammonium phosphate. A preferably quaternary ammonium salt is methyl tallow bis-2-hydroxyethyl ammonium bromide and/or chloride.

Regarding the first and third aspects of the invention, various nanocomposites of the first aspect of the invention comprised of a functionalized elastomer prepared via the aqueous process when incorporated and mixed in various rubber compositions have been observed to provide one or more of various improved fatigue properties, particularly, when the organoclay used contains quaternary ammonium salts that contain hydroxyl groups within the clay galleries. While the mechanism might not be fully understood, it is envisioned that the hydroxyl groups present in the quaternary ammonium surfactant facilitate better coupling and dispersion with the acid functionalities of the intercalating elastomer.

Regarding the first and third aspects of the invention, rubber composites may be prepared by blending the nanocomposites of the first aspect of this invention with various additional elastomers. For example, such other elastomers may be diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Regarding the second and third aspects of the invention, various nanocomposites of the second aspect of the invention may be prepared by blending the nanocomposites of the second aspect of this invention with various additional elastomers. For example, such other elastomers may be diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such additional conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, and polybutadiene and styrene/isoprene/butadiene terpolymers.

In the further practice of this invention, additional particulate reinforcement for the nanocomposite and/or rubber composite may also include particulate synthetic amorphous silica, particularly precipitated silica, or a combination of carbon black and amorphous silica (exclusive of silica treated carbon black), usually of an amount in a range of about 5 to about 100 alternately about 5 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm 3/100 g, and more usually about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge may be used.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to preparation of nanocomposites as well as rubber composites which contain such nanocomposites as well as manufactured articles, including tires, which have at least one component comprised of said nanocomposites and/or rubber composites.

The preparation of a rubber composite, namely the mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

For Examples I through IV, a nanocomposite preparation is exemplified in an aqueous medium with a blend of an acid-functionalized elastomer (maleated polybutadiene) with non intercalated sodium montmorillonite and with a pre-intercalated sodium montmorillonites that have been variously on exchanged with three different quaternary ammonium halide surfactants.

In particular, Cloisite 30B is reportedly an organoclay as a montmorillonite clay ion exchanged with methyl, tallow, bis-2-hydroxyethyl, quaternary ammonium chloride.

In particular Cloisite 15A is reportedly an organoclay as a montmorillonite clay ion exchanged with dimethyl, dihydrogenatedtallow, quaternary ammonium chloride.

In particular, Cloisite 25A is reportedly an organoclay as a montmorillonite clay ion exchanged with dimethyl, hydrogenatedtallow, 2-ethylhexyl, quaternary ammonium methyl sulfate.

The montmorillonite 2:1 layered silicate based organoclays were obtained from Southern Clay Products, Texas. The maleinized or maleated polybutadiene was obtained from Ricon Resins, Colorado.

EXAMPLE I

Nanocomposite Preparation With Intercalated Montmorillonite Clay

A nanocomposite of acid functionalized diene based elastomer and a dispersion of intercalated and partially exfoliated montmorillonite clay is prepared.

In particular, an aqueous latex dispersion of an acid functionalized polybutadiene elastomer (maleated polybutadiene) is prepared. Such latex is step-wise prepared by heating 750 ml of distilled water in a reaction vessel. To this, 4.1 g of an octylphenoxypolyethoxyethanol, a nonionic surfactant obtained as Triton™ X-100 from the Union Carbide company, is added and mixture is stirred at a temperature of about 75° C. To this solution, 39.1 g of Ricon™ 131MA20 of Ricon Resin, is added. According to Ricon Resin's published information, Ricon™ 13 MA20 is a polybutadiene elastomer with 20 percent maleic anhydride functionality and calculated number average molecular weight (Mn) of 2600 g/mole. To the turbid-milky dispersion of maleated-polybutadiene, 2.06 g of NaOH is added and stirred. The pH of the latex dispersion is measured as having a value in a range of about 8 to about 8.5. To the alkaline latex dispersion of maleated polybutadiene, 69.05 g of Cloisite 30B organoclay (which contains methyl, tallow, bis-2-hydroxyethyl, quaternary ammonium chloride), is added and mixed for 45 minutes at about 80° C. The organoclay-functionalized diene-based elastomer nanocomposite is recovered and dried. For the purposes of this Example, this nanocomposite is referred to as NC1.

EXAMPLE II

A nanocomposite of a clay-functionalized diene-based elastomer nanocomposite is prepared according to the method of Example but with Cloisite 15A organoclay (which contains dimethyl, dihydrogenatedtallow, quaternary ammonium chloride).

For this Example, 850 ml of distilled water, 8.9 g of Triton™ X-100, 50.5 g of Ricon 131MA20, 3 g of NaOH and 72.8 g of the Cloisite 15A was used.

The pH of the Nanocomposite aqueous dispersion is measured as having a value of about 8.0. The resulting nanocomposite was recovered by drying and is referred to herein as NC2.

EXAMPLE III

A nanocomposite of a clay-functionalized diene-based elastomer nanocomposite is prepared according to the method of Example but with Cloisite 25A organoclay (which contains dimethyl, hydrogenatedtallow, 2-ethylhexyl, quaternary ammonium methyl sulfate).

For this Example, 850 ml of distilled water, 6 g of Triton™ X-100, 53.6 g of Ricon 131 MA20, 3 g of NaOH and 79.6 g of the Cloisite 25A was used.

The pH of the Nanocomposite aqueous dispersion is measured as having a value of about 8.0. The resulting nanocomposite was recovered by drying and is referred to herein as NC3.

EXAMPLE IV

A nanocomposite of a clay-functionalized diene-based elastomer nanocomposite is prepared according to the method of Example but with Cloisite Na+ (obtained from Southern Clay Products company) as a montmorillonite clay which had not been pre-intercalated or pre-ion exchanged with a quaternary ammonium salt.

For this Example, 1,000 ml of distilled water, 6.6 g of Triton™ X-100, 45.4 g of Ricon 131MA20, 2.7 g of NaOH and 66.3 g of the Cloisite Na+ was used.

The pH of the Nanocomposite aqueous dispersion is measured as having a value of about 7.2. The resulting nanocomposite was recovered by drying and is referred to herein as NC4.

EXAMPLE V (COMPARATIVE)

In this example, a latex of an amine functionalized styrene/butadiene copolymer elastomer containing 23 percent bound styrene, wherein the amine functionalization was amine was created by copolymerizing vinyl pyridine with the styrene and 1,3-butadiene monomers, was mixed with the Cloisite 30B organoclay that contained hydroxyl groups in the quaternary surfactant. The pH of the latex was of a value of about 10. The mixture was heated to a temperature of about 75° C. for about one hour. It was observed that the organoclay particles were very difficult to wet in the aqueous medium and were apparently macroscopically not homogeneously dispersed. The experiment was, therefore, not further continued. This demonstrates that an organoclay as Cloisite 30B is difficult to disperse in an aqueous dispersion of an amine functionalized styrene/butadiene rubber.

EXAMPLE VI (COMPARATIVE)

In this example, an unfunctionalized styrene/butadiene elastomer latex having a bound styrene contend of about 40 percent was mixed with organoclay Cloisite 30B, in a manner similar to Example V. It was observed that the organoclay particles were difficult to wet in the aqueous medium and was apparently macroscopically not homogeneously dispersed. The experiment was therefore not further continued.

EXAMPLE VII

The nanocomposites from Examples I, III, and IV, namely Samples NC1, NC3 and NC4, and the corresponding organoclays (Cloisite 30B and Cloisite 15A) and sodium montmorillonite clay (Cloisite Na+) that were used to prepare the nanocomposites were examined by Wide angle X-ray (WAXR) scattering in a Scintag Diffractomer for the d-spacing between the platelets of the respective clays and nanocomposites in terms of (° A) for the peaks corresponding to the 001 reflections, the result of which are reported in Table 1:

TABLE 1

| Clays | (° A) | Nanocomposites | (° A) |
|---|---|---|---|
| Cloisite 30B | 18.4 | NC1 | 18.5 and 55.2 |
| Cloisite 15A | 28.8 and 19.5 | NC2 | 39.1 |
| Cloisite Na+ | 13.2 | NC4 | 5.5 |

It can be seen from the data reported in Table 1 that an increase in the d spacing has occurred between the Cloisite 15A and its corresponding nanocomposite, namely from 28.8° A and 19.5° A to a value of 39.1° A for the nanocomposite.

This is indicative of an expansion of the galleries between the platelets within the clay as a result of intercalation to create the nanocomposite which includes intercalated clay particles with expanded galleries between its platelets.

It can be seen from the data reported in Table 1 that an increase in the d- spacing has occurred between the Cloisite NA+ and its corresponding nanocomposite, namely from 13.2° A to a value of 15.5° A for the nanocomposite.

This is indicative of a really small expansion of the galleries between the platelets within the clay as a result of intercalation to create the nanocomposite which includes intercalated clay particles with expanded galleries between its platelets.

It can be seen from the data reported in Table 1 that an increase in the d- spacing has occurred between the Cloisite 30B and its corresponding nanocomposite, namely from 18.4° A to a value of 18.5° A and 55.2° A for the nanocomposite.

This is indicative of an expansion of the galleries between the platelets within the clay as a result of intercalation to create the nanocomposite which includes intercalated clay particles with expanded galleries between its platelets.

Therefore, it is considered that the increase in the d spacing for the of the nanocomposite over the corresponding clay or organoclay indicates the intercalation of the clay galleries with the maleated-polybutadiene.

The expansion (increase in d spacing) appears to be greater for the nanocomposite resulting from the organoclay (Cloisite pre-intercalated clays) than for the more non pre-intercalated clay, namely the hydrophilic sodium montmorillonite.

For the NC1 nanocomposite prepared with the pre-intercalated Cloisite 30B organoclay, the presence of the second peak corresponding to the original d-spacing of 18.5 indicates that a fraction of the clay was further intercalated. In practice, it is considered herein that the degree of further increase of intercalation of the clay may occur by increasing the pH of the latex dispersion.

It is to be appreciated that the results of Table 1 are intended to only demonstrate typical examples of the various degrees of intercalation with different quaternary ammonium surfactants and the sodium montmorillonite. Variations in the extent of intercalation and exfoliation are possible with variations in the process conditions. For example, such process variations may include increasing pH to about 13 prior to addition of clay or organoclay instead of using a pH in a range of about 7.2 to about 8.5, changing the sequence of addition of ingredients, pre-dispersing the clay in water and adding the water dispersion to the latex of elastomer particles, coagulating the nanocomposite by lowering the pH instead of drying. It is also considered herein to be possible to increase the ratio of the functionalized diene polymer to the clay or organoclay and to thereby increase the extent of intercalation of the clay. It is further considered herein to be possible to add the sodium montmorillonite as an aqueous dispersion thereof and add the quaternary ammonium salt for conducting an in-situ ion exchange. The ion exchange conducted with the quaternary ammonium halide surfactant may be below, at and above the cation exchange capacity (CEC) of the clay.

It is also considered herein as being possible to add the mixture of the clay or organoclay and maleinized-polybutadiene aqueous dispersion to more conventional and unfunctionalized latex such as an aqueous latex of styrene/butadiene elastomer particles, natural cis 1,4-polyisoprene elastomer or butadiene/acrylonitrile elastomer rubber, and then coagulating the latex mixtures in one step to obtain the nanocomposite.

It is considered herein that adding more sodium hydroxide (NaOH) to the aqueous dispersion can increase the solubility of the maleic anhydride functionalized polybutadiene elastomer in water. Depending on the increased concentration of NaOH there is also an increase in the pH of the dispersion, for example, of from a range of about 7.5 to 8.5 up to perhaps about 13. An effect of adding NaOH to the aqueous dispersion may be to convert the anhydride groups of the functionalized elastomer to acid groups and its corresponding acid salt. The presence of acid and its salt may be verified by FTIR (Fourier Transform infrared) technique. At high pH values resulting from higher NaOH concentrations, the turbid or milky latex or dispersion of maleic functionalized polybutadiene elastomer in water turns to more like a clear solution.

Rubber compositions which contain the respective nanocomposites NC1, NC2, NC3 and NC4 are illustrated in the following Tables 2 and 3 and identified as Samples A through H.

TABLE 2

| Control Nos. | 1 | | 2 | 3 | | 4 | | |
|---|---|---|---|---|---|---|---|---|
| Material | A | B | C | D | E | F | G | H |
| Non-productive Mixing Step (to about 170° C.) | | | | | | | | |
| Polyisoprene[1] | 100 | 100 | 100 | 100 | 100 | 100 | 100 | 100 |
| NC1[2] | 0 | 8 | 8 | 0 | 0 | 0 | 0 | 0 |
| Coupling agent[3] | 0 | 0 | 3 | 0 | 0 | 3 | 0 | 0 |
| Cloisite 30B | 0 | 0 | 0 | 5.14 | 0 | 0 | 0 | 0 |
| Ricon 131MA20 | 0 | 0 | 0 | 2.86 | 0 | 0 | 3.26 | 3.26 |
| NC4[4] | 0 | 0 | 0 | 0 | 8 | 8 | 0 | 0 |
| CloisiteNa+ | 0 | 0 | 0 | 0 | 0 | 0 | 4.74 | 0 |
| Stearic acid | 3 | 3 | 3 | 3 | 3 | 3 | 3 | 3 |
| Zinc oxide | 3 | 3 | 3 | 3 | 3 | 3 | 3 | 3 |
| N299 carbon black | 45 | 45 | 45 | 45 | 45 | 45 | 45 | 45 |
| Napthenic oil | 4 | 4 | 4 | 4 | 4 | 4 | 4 | 4 |
| Productive Mixing Step (to about 110° C.) | | | | | | | | |
| Sulfur | 3 | 3 | 3 | 3 | 3 | 3 | 3 | 3 |
| N-tert-butyl-2-benzothiazole | 1.5 | 1.5 | 1.5 | 1.5 | 1.5 | 1.5 | 1.5 | 1.5 |
| Sulfenamide santocure TBSI | 0.7 | 0.7 | 0.7 | 0.7 | 0.7 | 0.7 | 0.7 | 0.7 |

[1]Natsyn ® 2200, cis, 1,4-polyisoprene rubber, obtained from The Goodyear Tire & Rubber Company
[2]Nanocomposite of Example I composed of 2.86 parts of Ricon 131MA20 elastomer and 5.14 parts of the intercalated Cloisite 30B
[3]Nanocomposite of Example IV composed of 3.26 parts of Ricon 131MA20 elastomer and 4.74 parts of Cloisite Na+

Additional rubber compositions were prepared and referred to herein as Samples A and I through N as reported in the following Table 3.

TABLE 3

| Control Nos.: | 1 | 6 | 7 | 8 | 9 | 10 | 11 |
|---|---|---|---|---|---|---|---|
| Material | A | I | J | K | L | M | N |
| Non-Productive Mixing Step (to about 170° C.) | | | | | | | |
| Polyisoprene (Natsyn 2200) | 100 | 100 | 100 | 100 | 100 | 100 | 100 |
| NC2[1] | 0 | 8 | 8 | 0 | 0 | 0 | 0 |
| Coupling agent | 0 | 0 | 3 | 0 | 0 | 3 | 0 |
| Cloisite 15A | 0 | 0 | 0 | 4.73 | 0 | 0 | 0 |
| Ricon 131MA20 | 0 | 0 | 0 | 3.27 | 0 | 0 | 3.22 |
| NC3[2] | 0 | 0 | 0 | 0 | 8 | 8 | 0 |
| Cloistite Na+ | 0 | 0 | 0 | 0 | 0 | 0 | 4.78 |
| Stearic acid | 3 | 3 | 3 | 3 | 3 | 3 | 3 |
| Zinc oxide | 3 | 3 | 3 | 3 | 3 | 3 | 3 |
| N 299 carbon black | 45 | 45 | 45 | 45 | 45 | 45 | 45 |
| Napthenic Oil | 4 | 4 | 4 | 4 | 4 | 4 | 4 |
| Productive Mixing Step (to 110° C.) | | | | | | | |
| Sulfur | 3 | 3 | 3 | 3 | 3 | 3 | 3 |
| N-tert-butyl-2-benzothiazole | 1.5 | 1.5 | 1.5 | 1.5 | 1.5 | 1.5 | 1.5 |
| Sulfenamide santocure TBSI | 0.7 | 0.7 | 0.7 | 0.7 | 0.7 | 0.7 | 0.7 |

[1]Nanocomposite of Example II composed of 4.73 parts of organoclay Cloisite 15A and 3.27 parts of Ricon 131 MA20
[2]Nanocomposite of Example II composed of 4.78 parts of organoclay Cloisite 25A and 3.22 parts of Ricon 131 MA20

EXAMPLE VIII

Various physical properties of the rubber compositions illustrated in Tables 2 and 3 are reported in the following Tables 4 and 5 respectively.

(In the following Tables 4 and 5 the terms "ATS", "RSA", and "FTF" mean "Automated Tensile System", "Rheometrics Solids Analyzer", and "Monsanto Fatigue to Failure Test at Constant Strain " respectively. The term 'Ultimate' or 'Ult' means values at maximum load or break)

TABLE 4

| Properties | A | B | C | D | E | F | G | H |
|---|---|---|---|---|---|---|---|---|
| ATS | | | | | | | | |
| Ultimate tensile strength (MPa) | 20.8 | 20.4 | 18.3 | 19.5 | 15.6 | 13.5 | 17.6 | 19 |
| Ult elongation (%) | 337 | 357 | 308 | 375 | 291 | 254 | 349 | 364 |
| 100% Modulus, Mpa | 3.4 | 4.0 | 4.4 | 3.9 | 3.6 | 3.9 | 3.5 | 3.4 |
| 300% Modulus, Mpa | 19.9 | 18.3 | 19.8 | 16.5 | * | * | 16 | 16.5 |
| Monsanto FTF (100s of cycles) | 80.8 | 125.8 | 72.7 | 73.8 | 69.3 | 45.2 | 99.5 | 101 |
| RSA at 60° C., 11 Hertz | | | | | | | | |
| E' at 1% strain (MPa)[1] | 1.8 | 1.84 | 2.52 | 2.0 | 1.98 | 1.89 | 2.23 | 1.6 |
| Tan Delta at 1% strain[2] | 0.03 | 0.04 | 0.04 | 0.05 | 0.05 | 0.04 | 0.05 | 0.04 |

TABLE 5

| Properties | A | I | J | K | L | M | N |
|---|---|---|---|---|---|---|---|
| ATS | | | | | | | |
| Sulfenamide santocure TBSI | 0.7 | 0.7 | 0.7 | 0.7 | 0.7 | 0.7 | 0.7 |
| Ult Tensile strength (MPa) | 20.8 | 16.3 | 18.06 | 18.6 | 15.9 | 14.6 | 19.2 |
| Ult elongation (%) | 337 | 304 | 301 | 363 | 297 | 267 | 360 |
| 100% Modulus (MPa) | 3.4 | 4.1 | 4.7 | 4.0 | 4.0 | 4.3 | 4.1 |
| 300% Modulus, Mpa | 19.9 | 17.9 | 20.11 | 16.5 | 15.2 | * | 17.0 |
| Monsanto FTF (100s of cycles) | 80.8 | 61 | 43 | 59 | 39.5 | 37.5 | 66.5 |
| RSA at 60° C., 11 Hertz | | | | | | | |
| E' at 1% strain (MPa)[1] | 1.8 | 1.84 | 2.52 | 2.0 | 1.98 | 1.89 | 2.23 |
| Tan Delta at 1% strain[2] | 0.03 | 0.06 | 0.05 | 0.05 | 0.05 | 0.05 | 0.05 |

*indicates lower than 300% elongation at break, so no 300% modulus values are applicable

[1] The E' values determined at one percent strain, are a measure of Storage Modulus and are normally considered to be a measure of stiffness, wherein an increase of G' is a corresponding indication of an increase in the dynamic stiffness of the rubber composition and indicates improved cornering performance of the tire.

[2] The tan delta at one percent of elongations, are a ratio of loss modulus to storage modulus and are normally considered to be a measure of hysteresis wherein a lower hysteresis is typically desirable for better tire rolling resistance (less resistance to rolling) and therefore associated with better vehicular fuel economy. A decrease in the tan delta value is typically a corresponding indication of an decrease in hysteresis of the rubber composition.

The cycles in the Monsanto fatigue-to-failure test indicates durability of the vulcanizate in a constant strain fatigue application. It normally does not indicate the durability of the vulcanizate in constant load fatigue application.

It can be seen from Table 4 that Sample B, as compared to Control Samples A and H, has the highest fatigue to failure cycles with good balance of physical properties with high values for the 100 percent modulus and E'. This is considered herein to be significant and beneficial because of improved durability in applications such as tire sidewall and industrial engineered belts without sacrificing the static and dynamic stiffness. It can also be seen from Table 2 that Sample B, as compared to Control Sample A, has higher 100 percent modulus and E' and elongation at break, indicating simultaneous increases in stiffness and elongation.

It can also be seen that Sample C, as compared to Control Sample A, possesses even higher dynamic stiffness E' and 100 percent modulus, with only marginal increase in tan delta. The increase in dynamic stiffness is considered significant and beneficial to improve the handling or cornering performance of the tire. The anchoring of the organoclay Cloisite 30B with the Si69 silane-coupling agent is considered to impart additional stiffness to the vulcanized mixtures.

Sample B, where the organoclay Cloisite 30B was pre-intercalated with the maleated polybutadiene in the aqueous process of Example I, when compared with the Sample D, where the organoclay and maleated polybutadiene liquid polymer were added directly in the Batch Banbury mixer, indicates different but useful physical properties. Depending upon the application of the molded rubber articles, one process of combining the organoclay and maleated polybutadiene may be preferred to the other.

Sample N, where the Cloisite 25 A organoclay and maleated polybutadiene polymer were added in the Batch Banbury mixer, when compared with the control Sample A, shows higher elongation and higher 100 percent modulus and E'. Higher stiffness is beneficial for applications that require higher fatigue under constant load rather than a constant strain fatigue.

Transmission Electron Microscopy was carried out on select crosslinked mixtures of Cloisite 30B. Several 2–20 nanometer thick exfoliated organoclay platelets were found to be dispersed. The maleated-polybutadiene phase appeared to be associated with the organoclays. The dispersion of the organoclays in the rubber mixtures may be improved by using the maleated-polybutadiene with a lower functionality, i.e. 10 percent instead of the 20 percent that was used in above examples. Maleated-SBR may also be used. Diene elastomers with acrylic or methacrylic acids may also be used.

While various embodiments are disclosed herein for practicing the invention, it will be apparent to those skilled in this art that various changes and modifications may be made therein without departing from the spirit or scope of the invention.

What is claimed is:

1. A process of preparing a nanocomposite comprised of a functionalized diene-based elastomer and a 2:1 layered clay comprises blending:

(A) an aqueous dispersion of a functionalized diene-based elastomer having a Tg in a range of about −120° C. to about +10° C. and a number average molecular weight in a range of about 1,000 to about 1,000,000 g/mole, wherein said functionalized diene-based elastomer is selected from functionalized polyisoprene, functionalized polybutadiene, functionalized copolymers of styrene with at lest one of isoprene and 1,3-butadiene, and styrene-butadiene-glycidal methacrylate terpolymer, and (B) a particulate 2:1 multi-layered swellable silicate clay;

wherein said functionalized elastomer and styrene-butadiene-glycidyl methacrylate terpolymer are elastomers which contain one or more functional groups as protonated amine modified epoxide groups, wherein said aqueous dispersion has a pH in a range of about 2.5 to about 6.9 and wherein said clay contains at least one cationically exchangeable ion in the galleries between its layers comprised of at least one of sodium, magnesium, potassium and calcium ions.

2. The process of claim 1 wherein said clay is selected from at least one of smectite, vermiculite and mica clays.

3. The process of claim 1 wherein said clay is selected from montmorillonite and/or hectorite clays.

4. The process of claim 1 wherein said clay contains cationic exchangeable ions in its galleries between its layers comprised of at least one of sodium, magnesium, potassium and calcium ions.

5. The process of claim 1 wherein said functionalized elastomer is an epoxidized elastomer, wherein the said epoxy groups are modified by treatment with a primary or secondary amine selected from at least one of methylamine, ethylamine propylamine, butylamine, dimethylamine, diethylamine, dipropylamine, methylbutyl amine and dialkylaminoakylamines, followed by the protonation thereof by treatment with an acid selected from boric acid, formic acid, lactic acid, propionic acid, butyric acid, hydrochloric acid, phosphoric acid, sulfuric acid, carbonic acid and acetic acid.

6. The process of claim 1 wherein said functionalized elastomer is an epoxidized elastomer selected from epoxidized polyisoprene, epoxidized polybutdiene and epoxidized styrene-butadiene copolymer, wherein the said epoxy groups are modified by treatment with a salt of tertiary amine.

7. The process of claim 1 wherein said functionalized elastomer is selected from epoxidized natural cis 1,4-polyisoprene elastomer, epoxidized-polybutadiene or styrene-butadiene-glycidal methacrylate terpolymer.

8. A nanocomposite prepared according to the process of claim 1.

9. A rubber composite as a blend of said nanocomposite of claim 8 and at least one additional diene-based elastomer.

10. A rubber composite as a blend of said nanocomposite of claim 8 and at least one additional diene-based elastomer, and additional particulate reinforcement selected from carbon black, amorphous silica and coupling agent, or a combination of carbon black, amorphous silica and coupling agent.

11. An article of manufacture is having at least one component comprised of the rubber composite of claim 9.

12. A tire having at least one component comprised of the rubber composite of claim 9.

13. The tire of claim 12 wherein said tire component is selected from at least one of a tire tread, tire innerliner and tire sidewall.

14. A nanocomposite prepared according to the process of claim 5.

15. A rubber composite as a blend of said nanocomposite of claim 14 and at least one additional diene-based elastomer.

16. A rubber composite as a blend of said nanocomposite of claim 14 and at least one additional diene-based elastomer, and additional particulate reinforcement selected from carbon black, amorphous silica and coupling agent, or a combination of carbon black, amorphous silica and coupling agent.

17. A nanocpmposite prepared according to the process of claim 6.

18. A rubber composite as a blend of said nanocomposite of claim 17 and at least one additional diene-based elastomer.

19. A rubber composite as a blend of said nanocomposite of claim 17 and at least one additional diene-based elastomer, and additional particulate reinforcement selected from carbon black, amorphous silica and coupling agent, and carbon black, amorphous silica and coupling agent.

20. An article of manufacture is having at least one component comprised of the rubber composite of claim 15.

21. A tire having at least one component comprised of the rubber composite of claim 15.

22. A tire having at least one component comprised of the rubber composite of claim 18.

23. The tire of claim 21 wherein said tire component is selected from at least one of a tire tread, tire innerliner and tire sidewall.

24. The tire of claim 22 wherein said tire component is selected from at least one of a tire tread, tire innerliner and tire sidewall.

* * * * *